Figure 1:
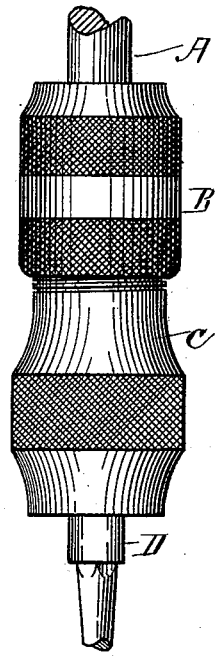

(No Model.)

A. D. GOODELL.
DRILL CHUCK.

No. 374,593. Patented Dec. 13, 1887.

WITNESSES.
Helen C. Parker
A. C. Thompson

INVENTOR.
Albert D. Goodell
by Bowdoin S. Parker
his atty.

United States Patent Office.

ALBERT D. GOODELL, OF MILLER'S FALLS, MASSACHUSETTS, ASSIGNOR TO THE MILLER'S FALLS COMPANY, OF SAME PLACE.

DRILL-CHUCK.

SPECIFICATION forming part of Letters Patent No. 374,593, dated December 13, 1887.

Application filed June 30, 1887. Serial No. 242,962. (No model.)

*To all whom it may concern:*

Be it known that I, ALBERT D. GOODELL, of Miller's Falls, in the county of Franklin and State of Massachusetts, have invented certain new and useful Improvements in Chucks, of which the following, taken in connection with the accompanying drawings, is a specification.

My invention relates to an improvement in chucks used for holding square and round shank-bits, drills, and other tools with irregular-shaped shanks. The said chuck is especially adapted to be used as a part of the ordinary bit stock or brace. It is also applicable wherever it is necessary to obtain a firm grip upon the shank of the article held in the chuck.

It is well known that the ordinary chuck now in use of this class does not hold round-shanked articles with a sufficient grip to prevent shifting or turning in the jaws when in use. The special object of my present invention is therefore to overcome this difficulty by so arranging the different parts of the chuck that a much more powerful force can be brought to bear upon the jaws which hold the shank of the tools or implement used.

In the drawings like letters of reference indicate corresponding parts.

Figure 2:
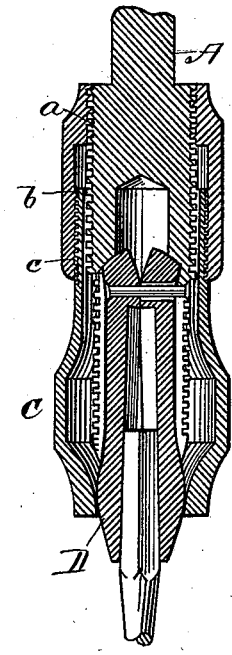
Figure 3:
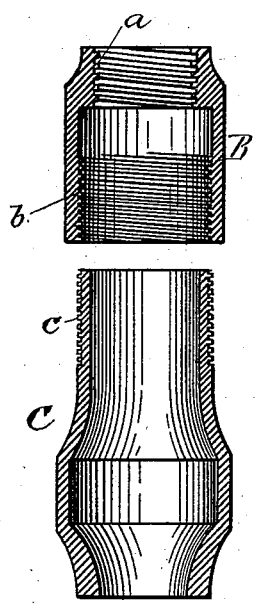

Figure 1 is an elevation representing the sleeve and differential nut as applied to an ordinary bit-brace. Fig. 2 is a sectional view in which the different parts of the chuck are shown. Fig. 3 is a sectional view of the sleeve and differential nut removed from the chuck and separated.

In Fig. 1, A is the spindle; C, the sleeve proper; B, the differential nut; D, the jaws.

In Fig. 2, $a$ represents the inside of the differential nut, threaded to conform to the screw-thread made upon the exterior surface of the spindle. $b$ represents the second screw-thread formed on the inside of the differential nut. $c$ is the threaded portion of the exterior of the sleeve C, by which it is united to the differential nut. The outer end of the spindle A is slotted to receive the jaws D, and is threaded, as shown, forming the usual threaded socket.

In Fig. 3 are shown the threaded portions of the sleeve C and nut B, as represented by the letters $a$ $b$ $c$.

My invention consists, principally, in the shell of the chuck, which I construct of two parts. The first or outer part, C, called the "sleeve," has its inner surface formed to correspond to the exterior surface of the jaws of the chuck, upon which said sleeve is brought to bear. The other part of the shell may, for convenience, be called a "differential nut," or a nut having two sets of threads of different pitch. The object of having threads of different pitch is to increase the pressure upon the jaws when force is applied to the differential nut.

The sleeve C has a threaded screw upon its lower external end, (indicated by $c$.) The differential nut has two sets of threads, (indicated by $a$ and $b$,) both formed upon the internal surface of the nut. The thread $b$ corresponds to the thread $c$, and the thread in the nut represented by $a$ corresponds to the thread formed upon the spindle-socket A, to which it is united. The screw-thread $a$ is made coarser than the screw-thread $b$, in order that greater pressure may be brought upon the jaws, as explained hereinafter.

The two parts of the shell C and B together form, when in operation, practically a single shell, the outer part of which passes over and is drawn upon the jaws D in the usual manner, thus compressing the jaws together upon the shank of the article or tool held therein.

It will readily be seen that with a shell constructed as described almost any amount of pressure may be applied to the jaws of the chuck.

The operation of this chuck is as follows: The shank of the tool is inserted between the jaws. The two parts of the shell being screwed closely together are placed over the jaws and the whole shell screwed down upon the spindle until the interior of the sleeve bears firmly upon the jaws. Then, by applying force to the differential-nut portion of the shell, turning the same upon the spindle and the threaded screw uniting the two parts of the shell, the pressure upon the jaws will be greatly increased, consequently holding the shank of the tool inserted therein with great tenacity.

In order to explain more clearly the operation of the differential-nut portion of the shell with the connecting part of the chuck, if, for example, I use twelve threads to the inch in the part of the differential nut which engages the spindle-socket and twelve and one-half threads to the inch in the part which engages the portion of the shell marked C, then the transverse motion of the shell to each revolution when the nut is used will only be the difference between twelve and twelve and one-half, which is equal to one three-hundredth part of an inch. This theoretically gives the same power as a thread with a pitch of three hundred threads to the inch. By making only one-half the above difference of the pitch of the two threads, twice the power will be obtained, or power equal to a nut with a thread of six hundred to the inch. It is manifest, however, that a nut with the fineness of thread suggested cannot be made and operated, and this difficulty I overcome in my present invention, producing the same effect by the use of the differential nut, as explained, as a part of the shell to the chuck. By the use of this differential nut as arranged in this combination, using twelve and twelve and one-fourth threads to the inch in combination, I am enabled theoretically to produce a pressure upon the jaws of the chuck fifty times greater than by the ordinary sleeve or shell heretofore employed formed with a thread of twelve to the inch. The ordinary pitch of thread in common use is twelve to the inch. Consequently I am enabled by this invention to hold firmly round, square, or irregular-shaped tools or articles or the shanks of said tools or articles more powerfully and securely than by any clutch or device heretofore known to me.

Having now described my invention, what I claim, and desire to secure by Letters Patent of the United States, is—

1. The combination of the sleeve C, differential nut B, spindle A, and jaws D, all arranged and adapted to operate substantially as and for the purposes set forth.

2. In a chuck, a shell consisting of two parts, one of said parts forming a differential nut, in combination with a threaded spindle, substantially as and for the purposes set forth.

3. In a chuck device, the sleeve C, formed to fit the exterior surface of the jaws and provided with the threaded part $c$, in combination with the differential nut B, provided with threaded parts $b$ $a$, said nut adapted to operate upon a threaded spindle, substantially as and for the purposes set forth.

4. In a chuck, a sleeve threaded at one end and adapted to compress the jaws of the chuck at the other end, in combination with a differential nut provided with two sets of screw-threads of different pitches or number of threads to the inch, and adapted to operate in connection with a spindle, substantially as and for the purposes set forth.

5. In a chuck, the combination of the sleeve C and nut part B, provided with a fine and a coarse threaded part and adapted to operate in connection with jaws suitably arranged, substantially as and for the purposes set forth.

In testimony whereof I have signed my name to this specification, in the presence of two subscribing witnesses, on this 23d day of June, A. D. 1887.

ALBERT D. GOODELL.

Witnesses:
E. S. ELLIOT,
T. J. GUNN.